United States Patent
Lemmers, Jr.

(10) Patent No.: US 8,853,911 B2
(45) Date of Patent: Oct. 7, 2014

(54) GENERATOR/MOTOR WEDGE WITH LAMINATION INTERFACE FOR REDUCED STRESS LEVELS

(71) Applicant: Hamilton Sundstrand Corporation, Windsor Locks, CT (US)

(72) Inventor: Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 123 days.

(21) Appl. No.: 13/629,669

(22) Filed: Sep. 28, 2012

(65) Prior Publication Data

US 2014/0091669 A1   Apr. 3, 2014

(51) Int. Cl.
*H02K 3/48* (2006.01)

(52) U.S. Cl.
USPC .......................................................... 310/214

(58) Field of Classification Search
USPC .......................................................... 310/214
See application file for complete search history.

(56) References Cited

U.S. PATENT DOCUMENTS

| | | | | |
|---|---|---|---|---|
| 434,206 | A | * | 8/1890 | Schmid .......................... 310/269 |
| 918,498 | A | * | 4/1909 | Behrend ........................ 310/262 |
| 1,042,408 | A | * | 10/1912 | Dearborn ....................... 310/214 |
| 2,945,140 | A | * | 7/1960 | Drabik et al. .................. 310/214 |
| 2,990,487 | A | * | 6/1961 | Stigler et al. .................. 310/214 |
| 6,331,745 | B2 | | 12/2001 | Blakelock et al. |
| 6,683,398 | B2 | | 1/2004 | Tong et al. |
| 6,882,079 | B2 | | 4/2005 | Kilpatrick et al. |
| 6,933,648 | B2 | * | 8/2005 | Buchan et al. ................. 310/214 |
| 7,541,714 | B2 | | 6/2009 | Parsania et al. |
| 7,743,675 | B2 | | 6/2010 | Moore |
| 7,821,171 | B2 | | 10/2010 | Lemmers, Jr. et al. |
| 8,193,783 | B2 | | 6/2012 | Himmelmann |
| 8,203,316 | B2 | | 6/2012 | Lemmers, Jr. |
| 8,232,702 | B2 | * | 7/2012 | Zywot et al. ................... 310/214 |
| 8,232,778 | B1 | | 7/2012 | Patel |
| 2004/0263019 | A1 | | 12/2004 | Buchan et al. |

* cited by examiner

*Primary Examiner* — Dang Le
(74) *Attorney, Agent, or Firm* — Carlson, Gaskey & Olds, PC

(57) ABSTRACT

A wedge for use in an electric machine has a central leg extending in a direction that will be radially inward when the wedge is mounted on a lamination stack. The wedge has arms extending in both circumferential directions from the central leg, with a circumferentially outermost part of the arms having a curved surface that will be radially outward, and a flat inner surface that will be radially inward when the wedge in mounted in the lamination stack. A generator/motor rotor and a generator/motor are also disclosed.

5 Claims, 3 Drawing Sheets

GENERATOR/MOTOR WEDGE WITH LAMINATION INTERFACE FOR REDUCED STRESS LEVELS

BACKGROUND OF THE INVENTION

This application relates to an interface between a generator/motor wedge and a pole tips on a lamination retaining the wedge and coils.

Generators/motors are known, and may include a lamination stack having pole pieces that receive wound field coils. Wedges are generally placed to separate and support the field coils.

In one known type of generator/motor, the lamination stack includes pole tips, which define a channel that captures a portion of the wedge and the field coils. In this prior art generator/motor, an interface surface between the pole tips and the wedges is generally polygonal, or along straight surfaces.

During operation, the generator/motor rotor may rotate at very high speeds, and thus there are centrifugal forces placed on the pole tips, the coils and the wedges. In particular, the wedge and coil may move away from a designed position, and the interface between the wedge and the pole tip may no longer be along the desired straight surface. In some applications, the pole tip has contacted a surface of the wedge spaced circumferentially away from the desired contact surface.

This undesired contact location creates a stress lever arm which is relatively long.

SUMMARY OF THE INVENTION

A wedge for use in an electric machine has a central leg extending in a direction that will be radially inward when the wedge is mounted on a lamination stack, The wedge has arms extending in both circumferential directions from the central leg, with a circumferentially outermost part of the arms having a curved surface that will be radially outward, and a flat inner surface that will be radially inward when the wedge is mounted in the lamination stack.

These and other features of the invention may be best understood from the following specification and drawings, the following of which is a brief description.

DETAILED DESCRIPTION

Figure 1:
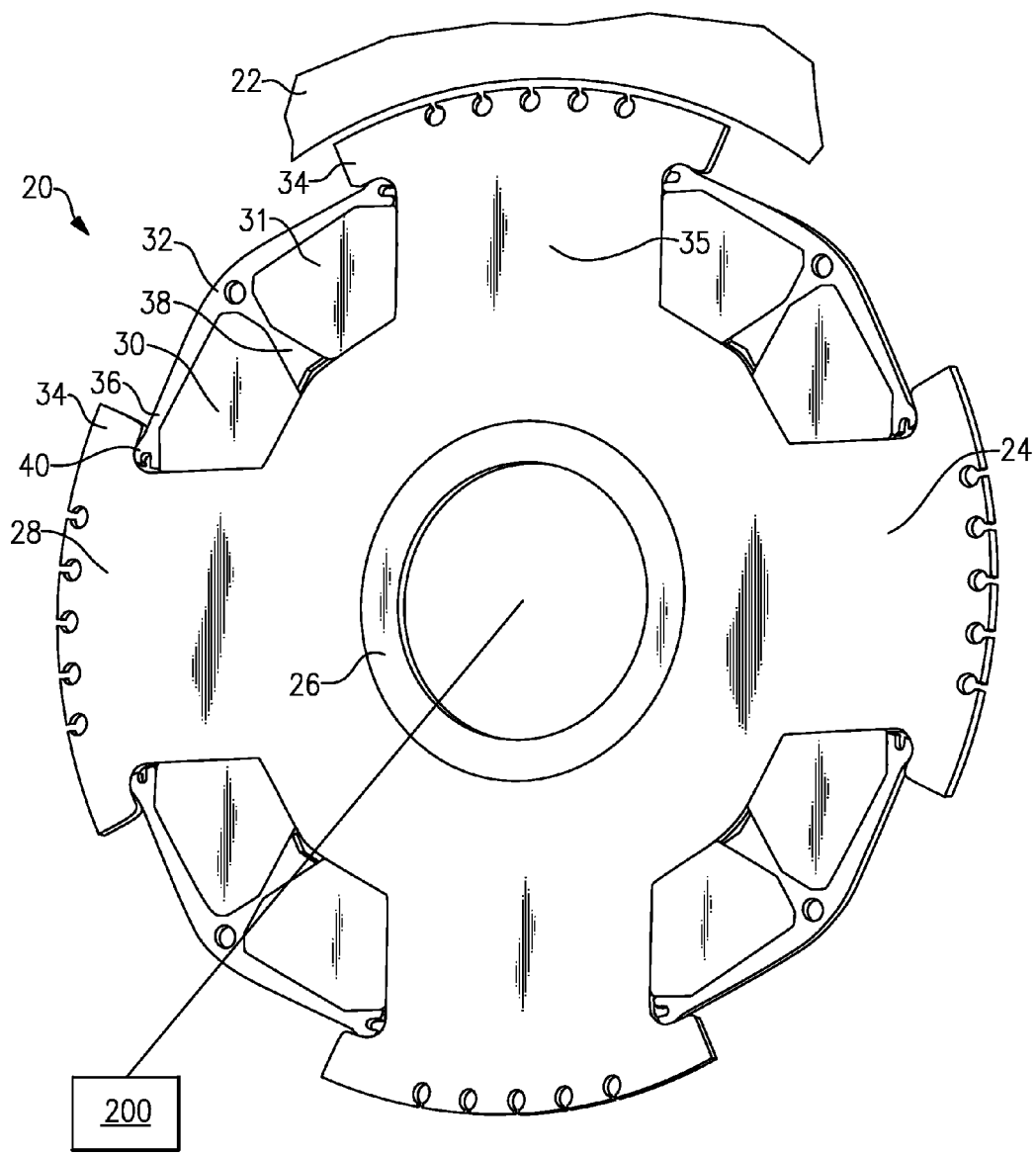
FIG. 1 shows a generator/motor in section.

FIG. 1 shows a cross-section of a machine 20 that may operate as a generator or a motor. As known, a rotor 24 includes a central shaft 26, which is driven to rotate by a source of rotation, such as a gas turbine engine 200 (shown schematically) and adjacent to a stator 22 (shown schematically) to generate electricity. The rotor 24 includes a lamination stack 28 having pole pieces 35 with circumferentially extending wedges 32. The wedges 32 sit in a channel radially inwardly of circumferentially opposed pole tips 34 on pole pieces 35. The channels receive field coils or windings 30 and 31, which are wound around the pole pieces 35.

A wedge 32 separates and supports adjacent coils 30 and 31. In this design, the wedge 32 has a central leg 38 extending radially inwardly between adjacent coils 30 and 31, and arms 36 extending circumferentially to sit underneath the pole tips 34. The central leg 38 may be significantly shorter in some applications. In the wedge 32 illustrated in FIG. 1, a circumferentially outermost portion 40 of the wedge has a generally curved interface with the pole tip 34, for purposes to be described below.

Figure 2A:
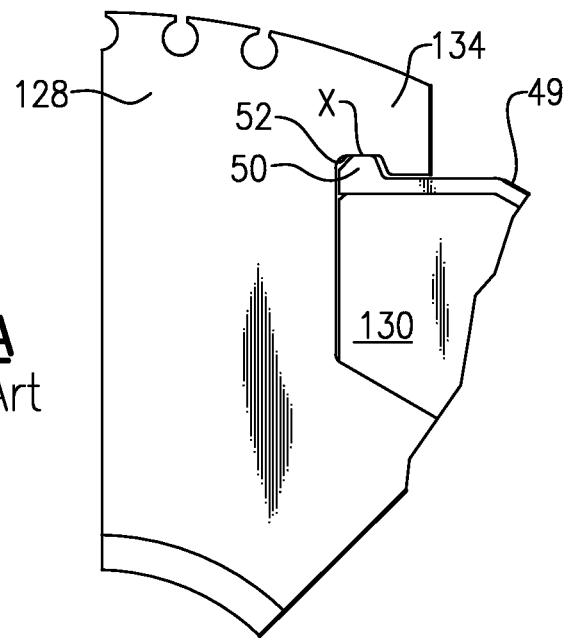
FIG. 2A shows a prior art wedge.

FIG. 2A shows the prior art lamination stack 128 having a pole tip 134 with a contacting portion 52 that contacts a portion 50 of the prior art wedge 49. Windings 130 are also shown. As can be appreciated, in this prior art, the desired contact between the wedge and the pole tip 134 is along a linear surface identified at X.

Figure 2B:
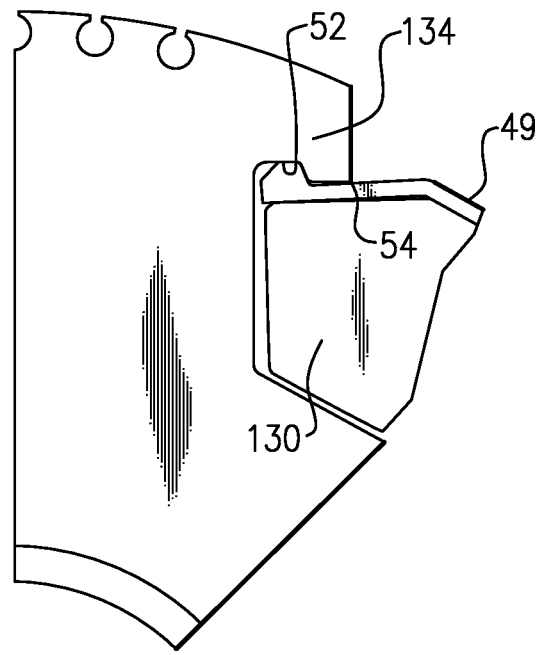
FIG. 2B shows the prior art wedge.

However, under load, the lamination stack 128 and wedge 49 deform under centrifugal forces induced by the artificial g field created when the rotor rotates, shifting the contact position such as shown in FIG. 2B. The contact is now at a point 54, and a stress lever arm in the lamination pole tip 34 is greater since the distance to the point of contact is greater.

Figure 3A:
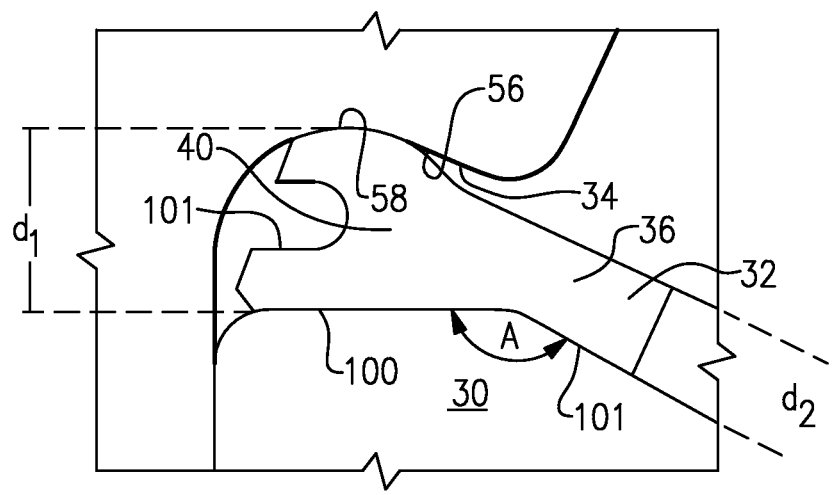
FIG. 3A shows the inventive wedge.

FIG. 3A shows an inventive wedge 32 having the circumferentially outer portion 40 formed with a flat lower surface 100 and a curved upper contact surface 58. A central recess 101 is provided to reduce weight, but is optional and may be eliminated. The pole tip 34 is also provided with a curved surface 56. The contact between the wedge 32 and the pole tip 34 is generally along the part-cylindrical or curved surfaces 56 and 58.

The circumferentially outermost portion 40 of wedge 32 extend for a greater radial $d_1$ thickness than a thickness $d_2$ of a portion of the arm 36 spaced circumferentially towards the leg 38. The flat radially inner surface 100 of the wedge extends along an angle that is non-parallel to portions 101 of the arm that are positioned circumferentially more central, or more adjacent to the leg, with the flat surface 100 extending in a direction with a component extending circumferentially, and another component extending radially inwardly, compared to the portion 101 of the arms spaced more towards the leg. Stated another way, angle A is defined between the radially inner surfaces 100 and 101. In an embodiment, A was 150 degrees. Angle A may be between 120 and 175 degrees in embodiments.

Figure 3B:
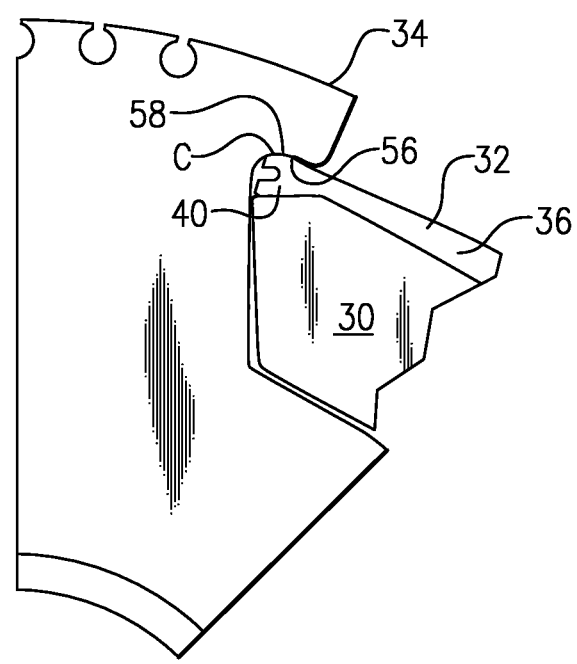
FIG. 3B shows the inventive wedge.

Now, if the coil and wedge shift somewhat, as shown in FIG. 3B, the contact point C still remains along the curved surfaces 58 and 56. Thus, the stress lever arm created in the pole tips 34 is relatively small.

Although an embodiment of this invention has been disclosed, a worker of ordinary skill the art would recognize that certain modifications would come within the scope of this invention. For that reason, the following claims should be studied to determine the true scope and content of this invention.

The invention claimed is:

1. A wedge for use in an electric machine comprising:
a central leg extending in a direction that will be radially inward when the wedge is mounted on a lamination stack, and said wedge having arms extending in both circumferential directions from said central leg, with a circumferentially outermost part of said arms having a curved surface that will be radially outward, and a flat inner surface that will be radially inward when the wedge in mounted in the lamination stack;
said flat inner surfaces of said circumferentially outermost part of said arms merging into a circumferentially more central portion of each said arm, with said circumferentially more central portion of said arms being at a non-parallel angle relative to said flat inner surface, and said angle being in a range of between 120 and 175 degrees; and said circumferentially outermost portion of said arms extending for a greater radial thickness than a portion of said arm spaced circumferentially towards said leg.

2. A machine rotor comprising:

a lamination stack having a plurality of pole pieces extending radially outwardly from a central axis, and said pole pieces having pole tips extending circumferentially at circumferential sides of said pole pieces;

field coils wound around each of said pole piece, such that between any two adjacent pole pieces, there are portions of two field coils;

a wedge positioned circumferentially intermediate said portions of said field coils, with a central leg extending radially inwardly to separate said portions of said field coils, and said wedge having circumferentially extending arms extending circumferentially to be radially inward of said pole tips on said lamination stack, with a curved surface on a circumferentially outermost portion of said wedge being in contact with a curved surface on a radially inward portion of said pole tip;

said circumferentially outermost portions of said arm have generally flat surfaces which abut said field coils; and said circumferentially outermost portion of said arms extending for a greater radial thickness than a portion of said arm spaced circumferentially towards said leg.

3. The rotor as set forth in claim 2, wherein said flat inner surfaces of said circumferentially outermost part of said arms merging into a circumferentially more central portion of each said arm, with said circumferentially more central portion of said arm being at a non-parallel angle relative to said flat inner surface, and said angle being in a range of between 120 and 175 degrees.

4. A machine comprising:

a stator;

a rotor including a lamination stack having a plurality of pole pieces extending radially outwardly from a central axis, and said pole pieces having pole tips extending circumferentially at circumferential sides of said pole pieces, field coils wound around each of said pole piece, such that between any two adjacent pole pieces, there are portions of two field coils;

a wedge positioned circumferentially intermediate said portions of said field coils, with a central leg extending radially inwardly to separate said portions of said field coils, and said wedge having circumferentially extending arms extending circumferentially to be radially inward of said pole tips on said lamination stack, with a curved surface on a circumferentially outermost portion of said wedge being in contact with a curved surface on a radially inward portion of said pole tip;

said circumferentially outermost portions of arm have generally flat surfaces which abut said field coils; and said circumferentially outermost portion of said arms extending for a greater radial thickness than a portion of said arm spaced circumferentially towards said leg.

5. The machine as set forth in claim 4, wherein said flat inner surfaces of said circumferentially outermost part of said arms merging into a circumferentially more central portion of each said arm, with said circumferentially more central portion of said arm being at a non-parallel angle relative to said flat inner surface, and said angle being in a range of between 120 and 175 degrees.

* * * * *

UNITED STATES PATENT AND TRADEMARK OFFICE
CERTIFICATE OF CORRECTION

PATENT NO. : 8,853,911 B2  Page 1 of 1
APPLICATION NO. : 13/629669
DATED : October 7, 2014
INVENTOR(S) : Glenn C. Lemmers, Jr.

It is certified that error appears in the above-identified patent and that said Letters Patent is hereby corrected as shown below:

IN THE CLAIMS:

Claim 4, column 4, line 21; after "of" insert --said--

Signed and Sealed this
Third Day of February, 2015

Michelle K. Lee
*Deputy Director of the United States Patent and Trademark Office*